(12) United States Patent
Couillard

(10) Patent No.: US 7,463,739 B2
(45) Date of Patent: Dec. 9, 2008

(54) METHOD AND SYSTEM PROVIDING IMPROVED SECURITY FOR THE TRANSFER OF ROOT KEYS

(75) Inventor: Bruno Couillard, Gatineau (CA)

(73) Assignee: SafeNet, Inc., Belcamp, MD (US)

( * ) Notice: Subject to any disclaimer, the term of this patent is extended or adjusted under 35 U.S.C. 154(b) by 695 days.

(21) Appl. No.: 09/919,960

(22) Filed: Aug. 2, 2001

(65) Prior Publication Data
US 2003/0026427 A1 Feb. 6, 2003

(51) Int. Cl.
*H04L 9/08* (2006.01)
*H04L 9/14* (2006.01)
*G06F 12/14* (2006.01)

(52) U.S. Cl. ........................ 380/284; 713/192; 713/193; 713/194; 380/45

(58) Field of Classification Search ................. 380/277, 380/278, 284, 45; 713/192–194
See application file for complete search history.

(56) References Cited

U.S. PATENT DOCUMENTS

| | | | | |
|---|---|---|---|---|
| 4,386,234 A | * | 5/1983 | Ehrsam et al. | 380/281 |
| 4,731,840 A | * | 3/1988 | Mniszewski et al. | 380/284 |
| 5,249,227 A | * | 9/1993 | Bergum et al. | 713/194 |
| 5,559,889 A | * | 9/1996 | Easter et al. | 380/30 |
| 5,680,458 A | | 10/1997 | Spelman et al. | |
| 5,680,548 A | | 10/1997 | Trugman | |
| 5,903,882 A | | 5/1999 | Asay et al. | |
| 5,970,475 A | | 10/1999 | Barnes et al. | |
| 5,991,399 A | | 11/1999 | Graunke et al. | |
| 5,995,625 A | | 11/1999 | Sudia et al. | |
| 6,012,100 A | | 1/2000 | Frailong et al. | |
| 6,069,957 A | * | 5/2000 | Richards | 380/281 |
| 6,073,172 A | | 6/2000 | Frailong et al. | |
| 6,131,120 A | | 10/2000 | Reid | |
| 6,148,400 A | * | 11/2000 | Arnold | 713/168 |
| 6,175,924 B1 | * | 1/2001 | Arnold | 713/189 |
| 6,223,291 B1 | * | 4/2001 | Puhl et al. | 726/28 |

(Continued)

FOREIGN PATENT DOCUMENTS

EP 0 886 409 A2 12/1998

(Continued)

OTHER PUBLICATIONS

Schneier, Apllied Crpytography, 1996, pp. 176-177.*

(Continued)

*Primary Examiner*—Emmanuel L. Moise
*Assistant Examiner*—Michael Pyzocha
(74) *Attorney, Agent, or Firm*—Drinker, Biddle & Reath, LLP (57) ABSTRACT

Disclosed are a system and a method for transferring with improved security root keys from a key provider system to a customer system via an information network that is other than secure. The key provider provides a secure module having a super-root key stored therein within the customer system. The super-root key is accessible internally to the module only by program code executable on a processor internal to the module, and only in response to a request from a corresponding module of the key provider system. The super-root key is only for use in decrypting encrypted root keys that are provided from the key provider system, which decrypted root keys are stored internally to the secure module.

12 Claims, 5 Drawing Sheets

U.S. PATENT DOCUMENTS

| | | | | |
|---|---|---|---|---|
| 6,240,188 B1 * | 5/2001 | Dondeti et al. | | 380/284 |
| 6,307,936 B1 * | 10/2001 | Ober et al. | | 380/30 |
| 6,331,784 B1 * | 12/2001 | Mason et al. | | 326/8 |
| 6,424,714 B1 * | 7/2002 | Wasilewski et al. | | 380/200 |
| 7,058,819 B2 * | 6/2006 | Okaue | | 713/193 |

FOREIGN PATENT DOCUMENTS

| | | | |
|---|---|---|---|
| WO | WO 01/24435 A1 | 4/2001 | |

OTHER PUBLICATIONS

Schneier, Bruce, Applied Cryptography, 1996, pp. 166-167.*

Davies et al., D.W., Security for Computer Networks, second edition, 1984, pp. 144, 145, and 158-168.*

Menezes, Alfred et al., Handbook of Applied Cryptography, CRC Press 1997, pp. 25-27 and 31.*

* cited by examiner

METHOD AND SYSTEM PROVIDING IMPROVED SECURITY FOR THE TRANSFER OF ROOT KEYS

FIELD OF THE INVENTION

This invention relates to a method and system for the secure transfer of cryptographic keys and in particular to a method and system for the secure transfer of private root keys via a communications network that is other than secure.

BACKGROUND OF THE INVENTION

It is becoming relatively common to exchange electronically stored documents between parties to a transaction, for instance via a widely distributed information network such as the Internet of the World Wide Web (WWW). A common problem with the Internet is a lack of secure communication channels. Thus, in order for hospitals, governments, banks, stockbrokers, and credit card companies to make use of the Internet, privacy and security must be ensured. One approach to solving the aforementioned problem uses data encryption prior to transmission. In a prior art system, a host computer is provided with an encryption unit comprising an encryption processor that is in electrical communication with a memory circuit for storing at least a private encryption key. When information is to be transmitted between the host computer system and a client station via the Internet and is of a confidential nature, the information is passed first to the encryption unit for encryption by the encryption processor using the stored at least a private key. Typically, a same private key is used every time a data encryption operation is performed. Optionally, an encryption key is selected from a finite set of private encryption keys that is stored in the memory circuit of the encryption unit.

Several standards exist today for privacy and strong authentication on the Internet through encryption/decryption. Typically, encryption/decryption is performed based on algorithms which are intended to allow data transfer over an open channel between parties while maintaining the privacy of the message contents. Encryption algorithms are typically classified into secret-key and public-key algorithms. In secret-key algorithms both of the keys are secret. Block ciphers are representative of the secret-key cryptosystems in use today. Usually, for block ciphers, symmetric key cryptography is used. In symmetric key cryptography, the encryption and decryption keys are the same. A block cipher takes a block of data, typically 32-128 bits, as input data and produces the same number of bits as output data. The encryption and decryption operations are performed using the secret-key, having a length typically in the range of 56-128 bits. The encryption algorithm is designed such that it is very difficult to decrypt a message without knowing the secret-key. It will be obvious to one of skill in the art that symmetric key cryptography is other than suitable for use in computer systems that allow public access by a plurality of different client stations via the Internet.

In addition to block ciphers, Internet security protocols also rely on private/public-key based algorithms in which one of the keys is made freely available to the general public. A private/public key cryptosystem such as the Rivest, Shamir, Adelman (RSA) cryptosystem described in U.S. Pat. No. 5,144,667 issued to Pogue and Rivest uses two keys, one of which is private and the other of which is made publicly available. Once someone publishes a public-key, anyone may send that person a secret message encrypted using that public key; however, decryption of the message can only be accomplished by use of the private key. The advantage of such private/public-key encryption is private keys are not distributed to all parties of a conversation beforehand. In contrast, when symmetric encryption is used, multiple secret keys are generated, one for each party intended to receive a message, and each secret key is privately communicated. Attempting to distribute secret keys in a secure fashion results in a similar problem as that faced in sending the message using only secret-key encryption; this is typically referred to as the key distribution problem.

Often, large financial institutions, for instance the chartered banks, rely on private/public key based encryption systems to provide secure transactions for their clients via the Internet. The private portion of the encryption key is stored in a secure area of a computer system maintained by the bank, for instance within an encryption unit in communication with a network server. Often, the computer system is kept in a locked room to which access is limited and controlled.

Despite the security precautions that are taken by the user, as detailed above, from time to time key compromise will occur. The compromise of a private key by an unauthorized third party allows immediately any data that is passed through the encryption unit to be converted back into a plain text form and to be read by the third party. When such data includes financial information or information of a personal and confidential nature, then the potential also exists for the unauthorized third party to cause serious inconvenience and/or financial loss to a legitimate user of the encryption unit. Of course, the unauthorized third party includes outside parties, for instance a hacker, and inside parties, for instance a dishonest computer administrator or a disgruntled employee. A particular threat is an inside party who is conducting industrial espionage to the benefit of a competitor.

In the event of key compromise of a multiple private/public-key system, the user immediately stops using the compromised key and switches to a private/public-key that is secure. Often this involves retrieving a storage medium having a secure private/public-key stored therein and transferring the private/public-key to the memory of the encryption unit. It is a disadvantage of the prior art system that the process of replacing a compromised private/public-key is time consuming. Further, when key compromise occurs outside of regular office hours there is an additional period of system down-time associated with the time for an authorized individual to attend the encryption unit site to replace the private/public-key.

Of course, in the event that every encryption key of an encryption system is compromised during a same overlapping period of time, the user immediately discontinues communication via the Internet and is required to purchase replacement keys from a key provider. At this stage the key provider faces a problem similar to the user's original problem of securely transferring confidential data between the user and the intended recipient, for instance the key provider must deliver the private key to the user via a communications network that is other than secure. Of course, one solution is for the key provider to physically attend at the user's computer system to deliver and install the new the private key. While this raises the security to a very high level there is an extended period of system down-time, which is extremely costly to the user. In major financial institutions such as banks, investment houses, large wholesale businesses and other organizations, to have a communication system out of use for a period of several hours is not acceptable.

A system which provides improved security for the delivery of a private key to a user via a communications network that is other than secure is known in the prior art. In the prior art system the key provider provides initially a root key to the user. The root key is for use by the user in obtaining private key replacements as soon as compromise of an existing private key occurs. For instance, the user is provided with a first private/public key pair and a second private/public key pair. The first private/public key pair is used routinely to encrypt confidential data prior to transfer via the Internet, such that communications between the user and user's clients are substantially secure. The second private/public key pair, referred to as the root key pair herein, is used exclusively for decrypting private keys that are occasionally provided in an encrypted form by the key provider. For instance, the key provider encrypts a new private/public key pair for transmission to the user via the Internet using the public root key associated with the user's private root key. Upon receipt, the user decrypts the encrypted private/public key pair using the private root key and is able to resume business operations with minimal loss of time. The root key is used relatively less often than the first private key and as such the root key is less susceptible to key compromise compared to the first private key other than by an "insider." Optionally the root key is longer than the first private key, such that encrypting and decrypting data using the root key requires relatively more processing resources than using the first private key, reducing further the incidences of root key compromise.

It is a limitation of the prior art system that once the user is in receipt of a private key the continued secure status of that private key is dependent upon the security precautions that are enacted by the user. If the precautions are other than adequate then more frequent incidences of key compromise are expected. Further, if the user stores the private root key along with the private key then more frequent incidences of root key compromise are expected. Of course, when the root key is itself compromised the user must request the key provider to physically attend the computer site and install replacement private and root keys. Should the user continue to use the root key after it is compromised, then any private keys encrypted for transfer using that root key are susceptible to key compromise during transmission via the information network. It is a further limitation of the prior art system that if the root key is itself compromised then the system for private key replacement is vulnerable.

It would be advantageous to provide a method and a system for the secure transfer of private encryption keys via a widely distributed information network, such as for instance the Internet. The system would allow a key provider to establish a communication path between the customer, for instance the user of a computer system, and the key provider, which path is substantially secure to a level of trust that is determined in dependence upon the key provider system. Advantageously, the security of the "secure" communication path is other than limited by the security level of the customer. Further advantageously, the level of security of the communication path is approximately a same level for every transaction involving the key provider, such that a client of the customer is assured a minimum predetermined level of trust that is related to the key provider.

OBJECT OF THE INVENTION

It is an object of the present invention to provide a method and a system for transferring private root keys with improved security via an information network that is other than secure.

It is a further object of the present invention to provide a method and a system for transferring private root keys via an information network that is other than secure and at a trust level that is determined in dependence upon the security precautions of the key provider.

It is yet a further object of the present invention to provide a method and an independently auditable system for transferring private root keys via an information network that is other than secure.

SUMMARY OF THE INVENTION

With the present invention a root key user is provided with the facility of having root keys generated by a root key provider and inserted into the user's message facility by the provider near instantaneously, on request, in a completely secure manner. The root key provider works in conjunction with a module supplied by the provider, inserted into the circuitry of the user's message facility. The module is accessible only by the provider and as such is completely secure against unauthorized entry.

In accordance with the present invention there is provided a method for transferring a first electronic key between a key provider system and a second other system via an information network comprising the steps of:

a) encrypting the first electronic key using a first encryption key of the key provider;

b) providing within the second other system a first secure module having a second encryption key within a read-only memory circuit thereof and provided with the first secure module, the second encryption key accessible only by program code being executed on a processor internal to the first secure module, and wherein the second encryption key is other than modifiable and other than accessible outside of the module;

c) transferring the encrypted first electronic key from the key provider system to the second other system via the information network;

d) providing the encrypted first electronic key to the processor internal to the first secure module of the second other system; and, e) executing program code on the processor internal to the first secure module to decrypt the encrypted first electronic key using the second encryption key stored within the read-only memory circuit of the first secure module and to store the decrypted first electronic key internally within a secure key memory location of the first secure module.

In accordance with the present invention there is further provided a method for transferring a first electronic key between a key provider system and a second other system via an information network comprising the steps of:

a) encrypting the first electronic key using a first encryption key of the key provider;

b) providing within the second other system a first secure module having second and third encryption keys within a memory circuit thereof, the second and third encryption keys accessible only by program code being executed on a processor internal to the first secure module for decrypting encrypted electronic keys and for storing the decrypted electronic keys within a memory circuit of the first secure module, and wherein the second and third encryption keys are other than accessible outside of the module;

c) transferring the encrypted first electronic key from the key provider system to the second other system via the information network;

d) providing the encrypted first electronic key to the processor internal to the first secure module of the second other system; and, e) executing program code on the processor internal to the first secure module to decrypt the encrypted first electronic key using the second encryption key stored within the memory circuit of the first secure module and to store the decrypted first electronic key internally within a secure key memory location of the first secure module.

In accordance with another aspect of the present invention there is provided a system for transferring a secure electronic key between a key provider system and a second other system via an information network that is other than secure comprising a secure module in operative communication with the second other system, the secure module including:

an encryption processor;

an input port for receiving encrypted electronic data from outside the module and for providing the encrypted electronic data to the encryption processor;

a memory circuit in operative communication with the encryption processor for storing at least a first encryption key;

memory storage having program code stored therein and executable on the encryption processor for, upon receipt of an encrypted secure electronic key, decrypting the encrypted secure electronic key using the at least a first encryption key and for storing the decrypted secure electronic key within the memory circuit, the at least a first encryption key being other than accessible by any code other than the program code and being other than modifiable thereby.

In accordance with the other aspect of the present invention there is provided a system for transferring a secure electronic key between a key provider system and a second other system via an information network that is other than secure comprising a secure module in operative communication with the second other system, the secure module including:

an encryption processor;

an input port for receiving encrypted electronic data from outside the module and for providing the encrypted electronic data to the encryption processor;

a memory circuit in operative communication with the encryption processor for storing a first encryption key within a first memory location thereof and for storing a second encryption key within a second other memory location thereof;

memory storage having program code stored therein and executable on the encryption processor for, upon receipt of an encrypted third encryption key from the second other system, decrypting the encrypted third encryption key using one of the first and second encryption keys and for storing the decrypted third encryption key approximately within the same memory location of the other one of the first and second encryption keys, the first and second encryption keys being other than accessible by any code other than the program code and being other than modifiable absent erasing thereof by any code other than the program code.

BRIEF DESCRIPTION OF THE DRAWINGS

Exemplary embodiments of the invention will now be describe in conjunction with the following drawings, in which.

DETAILED DESCRIPTION OF THE DRAWINGS

Figure 1:
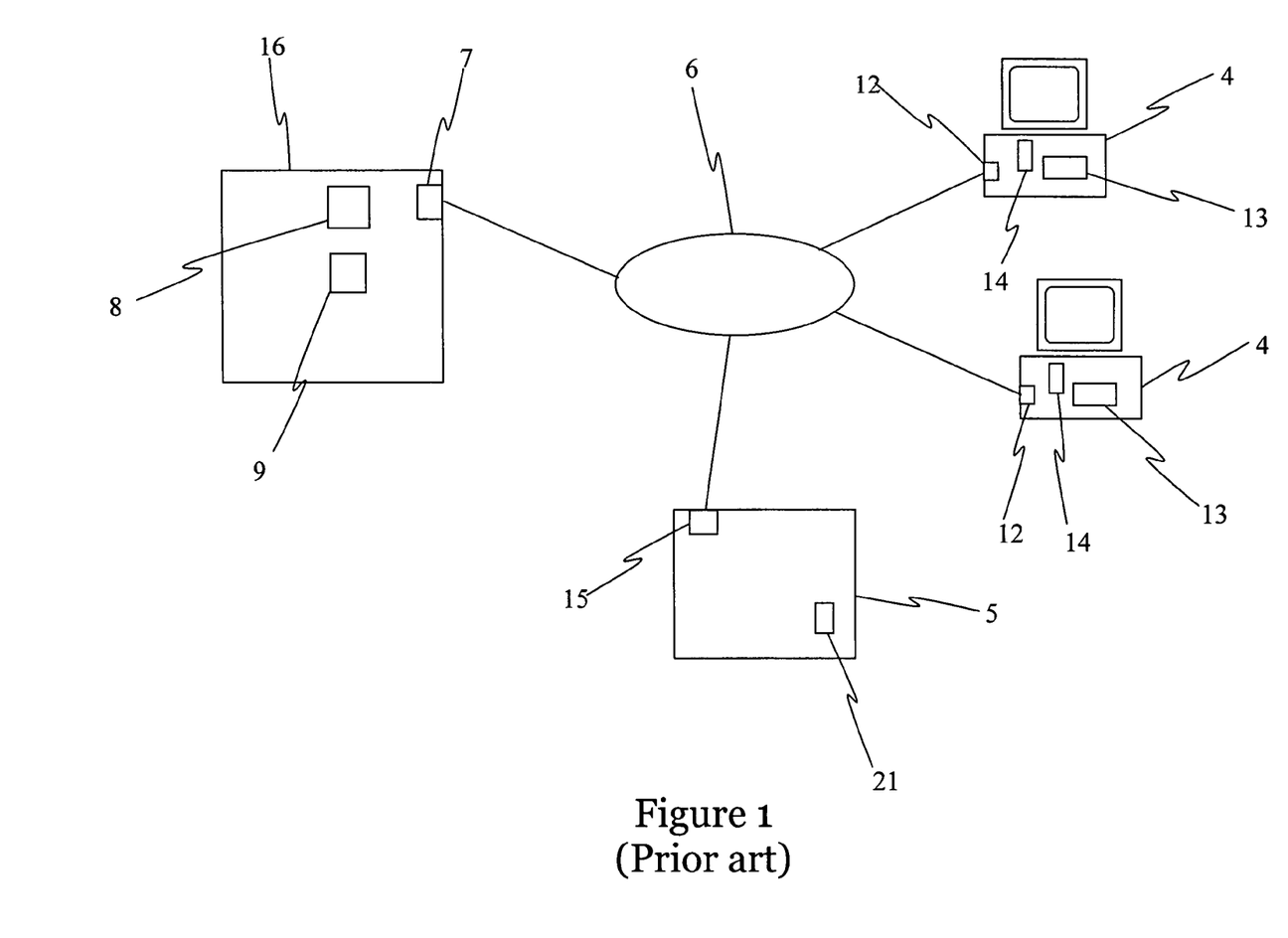
FIG. 1 shows a simplified block diagram of a prior art system for providing a private key to a computer system via an information network that is other than secure.

Referring to FIG. 1, shown is a simplified block diagram of a prior art system for providing a private encryption key to a computer system via an information network that is other than secure. A computer system 16 in the form of a network server comprises an input/output port 7, a processor 8 and a memory circuit 9. The computer system 16 is in operative communication with a plurality of client stations 4 and with a network server 5 of a key provider via an information network 6 that is other than secure. Memory circuit 9 is for storing at least a private/public root key pair and a private/public encryption key pair. The encryption key pair is used to encrypt/decrypt confidential data that is passed routinely between the computer system 16 and the plurality of client stations 4. The root key pair is used only to encrypt/decrypt replacement encryption key pairs that are provided occasionally to the computer system 16 by the network server 5 of the key provider. For instance, the network server 5 includes a key-providing unit 21 for generating at least a private/public encryption key pair and for encrypting the key pair with a public portion of a root key prior to transmission to computer system 16. Assuming that the private portion of the root key pair is secure within computer system 16, then the encrypted encryption key pair can be decrypted only by computer system 16 using said private root key. Of course a client 4, who must rely entirely upon said encryption key pair to protect the confidentiality of their data, may be other than willing to make such an assumption regarding the security of the private root key.

It is a limitation of the prior art system that once a private encryption key is transferred from the network server 5 to the computer system 16, the burden of preventing key compromise rests entirely with the user of computer system 16. As will be obvious to one of skill in the art, the compromise of a private encryption key that is stored within computer system 16 is expected to occur after a shorter time interval if the private encryption key is accessible externally. External access includes access by employees of the company that own the computer system 16 and by a dishonest system administrator whose job it is to ensure that the private key remains secure. Additionally, if the private root key is stored along with the private encryption key, then the private root key is similarly vulnerable to frequent key compromise. A client 4 must therefore determine a level of trust with which they are comfortable before passing confidential data to computer system 16 via the information network 6. Often it is other than possible for the client 4 to establish a reasonable basis for the level of trust that is indicated, and said client may elect not to transact with computer system 16 via the information network 6.

Figure 2:
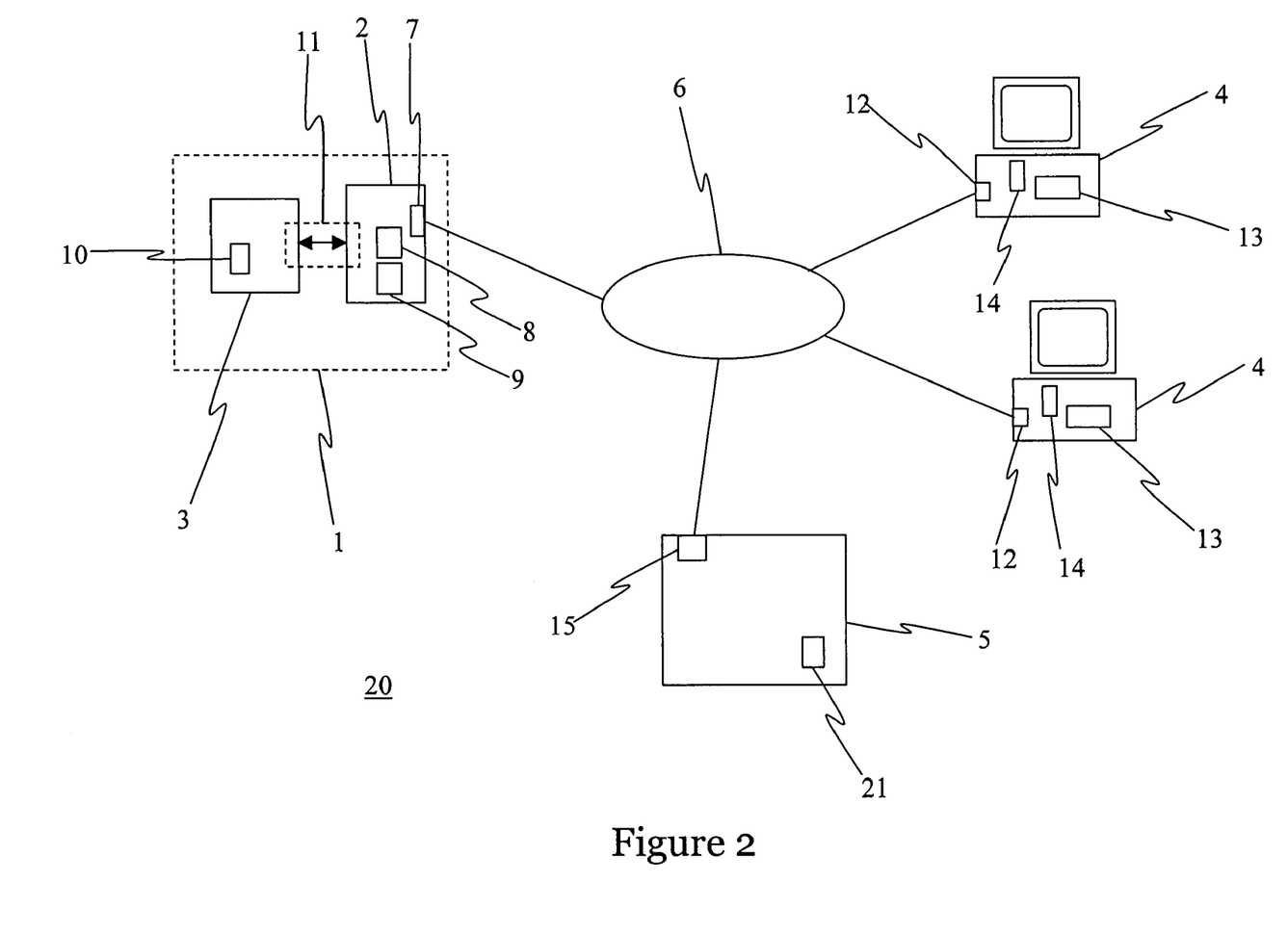
FIG. 2 shows a simplified block diagram of a system according to a first preferred embodiment of the present invention.

Referring to FIG. 2, a simplified block diagram of a system according to a first preferred embodiment of the present invention is shown generally at 20. A computer system 1, including a network server 2 and an encryption unit 3, is in operative communication with a plurality of client stations 4 and a server 5 of a key provider via an information network 6 that is other than secure. The network server 2 comprises an input/output port 7 for sending and receiving data via the information network 6, a processor 8 for processing data and a memory circuit 9 for storing data, the memory circuit being in electrical communication with processor 8. Of course, the circuitry for providing electrical communication between the internal components of the network server 2 is well known in the art and has been omitted from the present discussion for the sake of brevity.

The encryption unit 3 includes at least a secure cryptographic module 10 for performing cryptographic functions, for instance a PCMCIA card. U.S. application Ser. Nos. 08/758,221, 09/305,476 and 09/666,093 disclose a secure cryptographic module, the contents of which are incorporated by reference herein. The key provider supplies the module 10 to the user of computer system 1, for example as part of a contractual agreement to provide private encryption keys to the user. Stored within a memory circuit (not shown) of module 10 is one of a symmetric super-root key and an asymmetric private/public super-root key pair, generally referred to as the super-root key herein. Optionally, a root key pair and an encryption key pair are also written to the memory circuit of module 10 before it is shipped to the user. Of course, the memory circuit of module 10 is one of a non-volatile memory circuit (ROM) and a volatile memory circuit (RAM) having an on-board power supply in the form of a battery to prevent erasure of the super-root key during transportation of the module 10 to the user. Further, any external attempts to probe the electronic contents of the module 10, by electronic or mechanical methods, deactivates the module and erases the secure data stored therein, including the private super root key. Accordingly, external access to the private super-root key is avoided at all times. Such extreme security precautions are required for module 10 to be compliant with existing security standards, for example the FIPS-140 requirements.

Programming that is executed internal to module 10 prevents the super-root key from at any time being provided to outside of the module 10. Additionally, the super-root key is other than available for performing cryptographic operations other than exchanging root keys. The module 10 of computer system 1 is FIPS-140 compliant for the operation of exchanging private root keys, and if said decrypted private root keys are available for use only within the secure module then any operations that employ said root keys are also FIPS-140 compliant. Advantageously, the transfer of root keys to computer system 1 is achieved at a level of security that is limited by the security of network server 5, which level of security is a same level of security for every computer system 1 that is a customer of the key provider.

Referring still to FIG. 2, the system 20 utilizes three hierarchal levels of secure electronic keys, each level of secure electronic key for performing a different predetermined operation. The encryption key pair is used routinely for encrypting and decrypting messages that are passed between the computer system 1 and a client station 4. Due to its frequent usage, the length of the private encryption key is typically limited to an approximate range of between 128 bits and 1024 bits. Shorter, less secure encryption keys often are employed so as to reduce the processing resources that are expended to execute the encryption algorithms. Of course, frequent usage combined with the relatively short length renders the private encryption keys more susceptible to key compromise, and therefore more frequent replacement. The root key pair is used only to encrypt and decrypt encryption keys that are passed between the network server 5 and the computer system 1. Advantageously, the private root key is used less frequently than the private encryption key and is therefore less susceptible to key compromise. Further advantageously, the length of the root key is optionally an increased length, for example to an approximate range of between 512 bits and 2048 bits. The additional demands on processing resources to encrypt/decrypt with the longer root keys is positively offset by the increased security provided by the longer key length. Optionally, the user of computer system 1 may elect to make the encryption key and/or the root key available outside of the module 10, for instance to allow at least processor 8 to perform the encryption/decryption operations directly. Of course, operations performed outside of module 10 using the encryption and root keys are other than FIPS-140 compliant.

The third level of secure electronic key is the super-root key. Unlike the encryption key and the root key, the super-root key is optionally one of a symmetric key and an asymmetric private/public key pair. The super-root key is preferably used only for encrypting and decrypting root keys for transmission via the information network 6, an operation that is performed only when a root key is compromised or at the end of a predetermined usage limit for a root key. Since the super-root key is used most infrequently, the length of the super-root key is preferably longer than the length of the root key, for example within an approximate range of between 2048 bits and 4096 bits. According to the system described with reference to FIG. 2, the super-root key is stored within module 10 prior to module 10 being shipped to the computer system 1. Advantageously, a same symmetric super-root key is provided to every module that is shipped by a same module provider in the form of a key provider. The super-root key is accessible only by code internal to a module 10, and is used with such infrequency that super-root key compromise is statistically unlikely to occur during any reasonably useful operating period of the system. Of course, different super-root keys are optionally provided to different modules 10, and/or asymmetric super-root keys are provided to the modules 10. The private encryption and private root keys are optionally stored within module 10 before it is shipped, or they are purchased from the key provider subsequent to the module 10 being installed in computer system 1.

Figure 3:
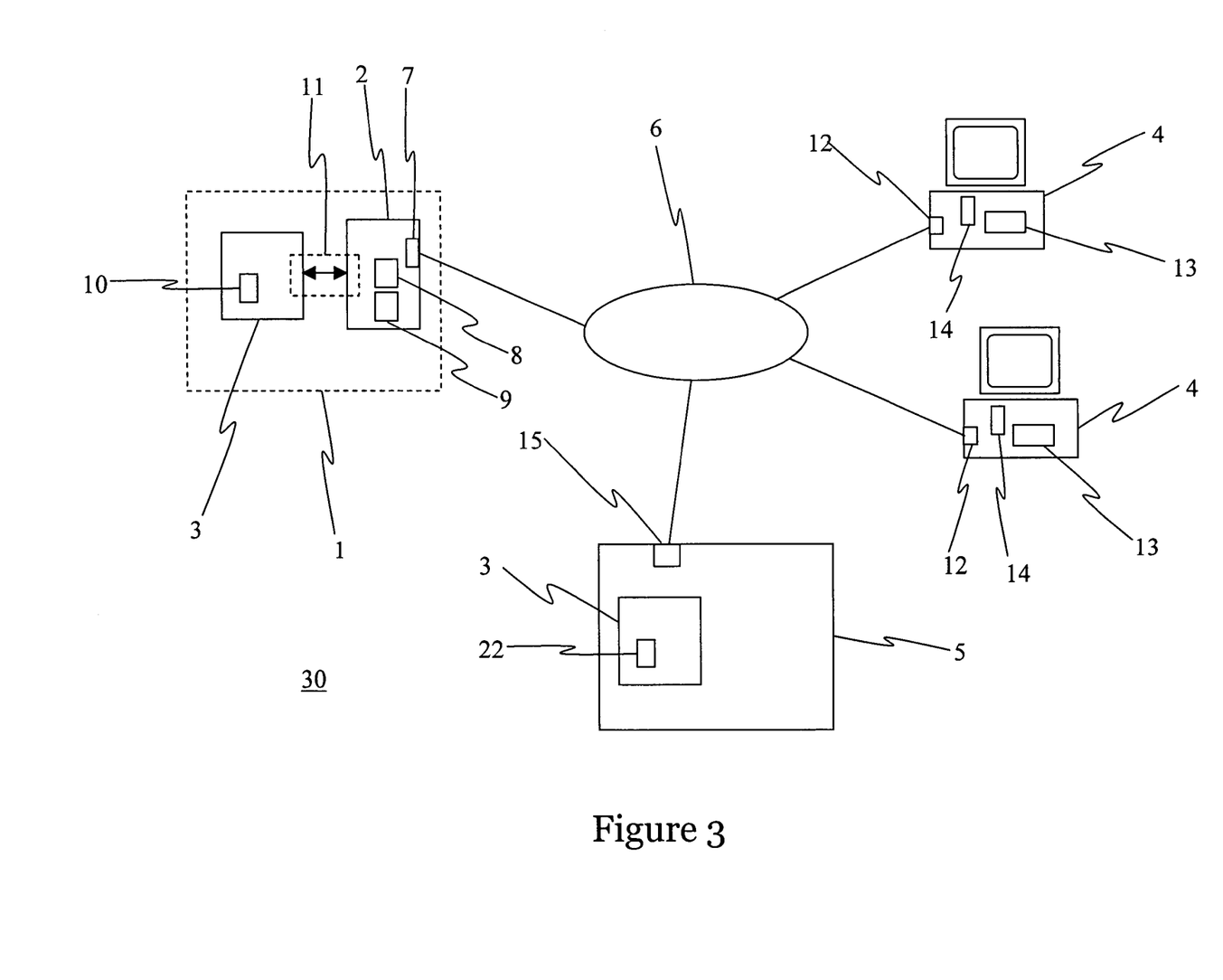
FIG. 3 shows a simplified block diagram of a system according to a second preferred embodiment of the present invention.

Referring to FIG. 3, a simplified block diagram of a system according to a second preferred embodiment of the present invention is shown generally at 30. Elements having identical function are assigned like reference numerals to those of FIG. 2 and have been omitted from the present discussion in the interest of brevity. System 30 enables a key provider to establish a secure communication path for the exchange of encrypted root keys between computer system 1 and network server 5 via the information network 6. In addition, the key-providing unit 21 of system 20 is replaced with an encryption unit 3 including a secure module 22, which is similar to secure module 10 of computer system 1. Module 22 includes a memory circuit (not shown) for storing at least a super-root key, a key-generator (not shown) for generating new root keys and an encryption processor (not shown) for encrypting the new root keys with the super-root key. Advantageously, a same symmetric super-root key is provided to every module that is shipped by a same key provider. The super-root key is accessible only by code internal to a module 10, and is used with such low frequency that super-root key compromise through an attack on encrypted data is statistically unlikely to occur during any reasonable useful operating period of the system. Of course, different super-root keys are optionally provided to different modules 10, and/or asymmetric super-root keys are provided to the modules 10. In use, module 10 communicates directly and exclusively with module 22 for exchanging root keys. Communication is performed using code which is independently auditable, for instance by an auditing group that is responsible for verifying compliance with standards for secure communication via the Internet. One such standard is FIPS-140. Advantageously, the communication path for exchanging root keys using system 30 is at least as secure as both of the key provider and the independent auditing group. The client 4 can trust the key provider and trust the auditing body. Thus, the module provider ensures security of encryption keys within its modules, the assurance independently verified. There is no longer the issue of each customer being responsible for its own security and, as such, small and large organizations can equally benefit from the invention.

Figure 4:
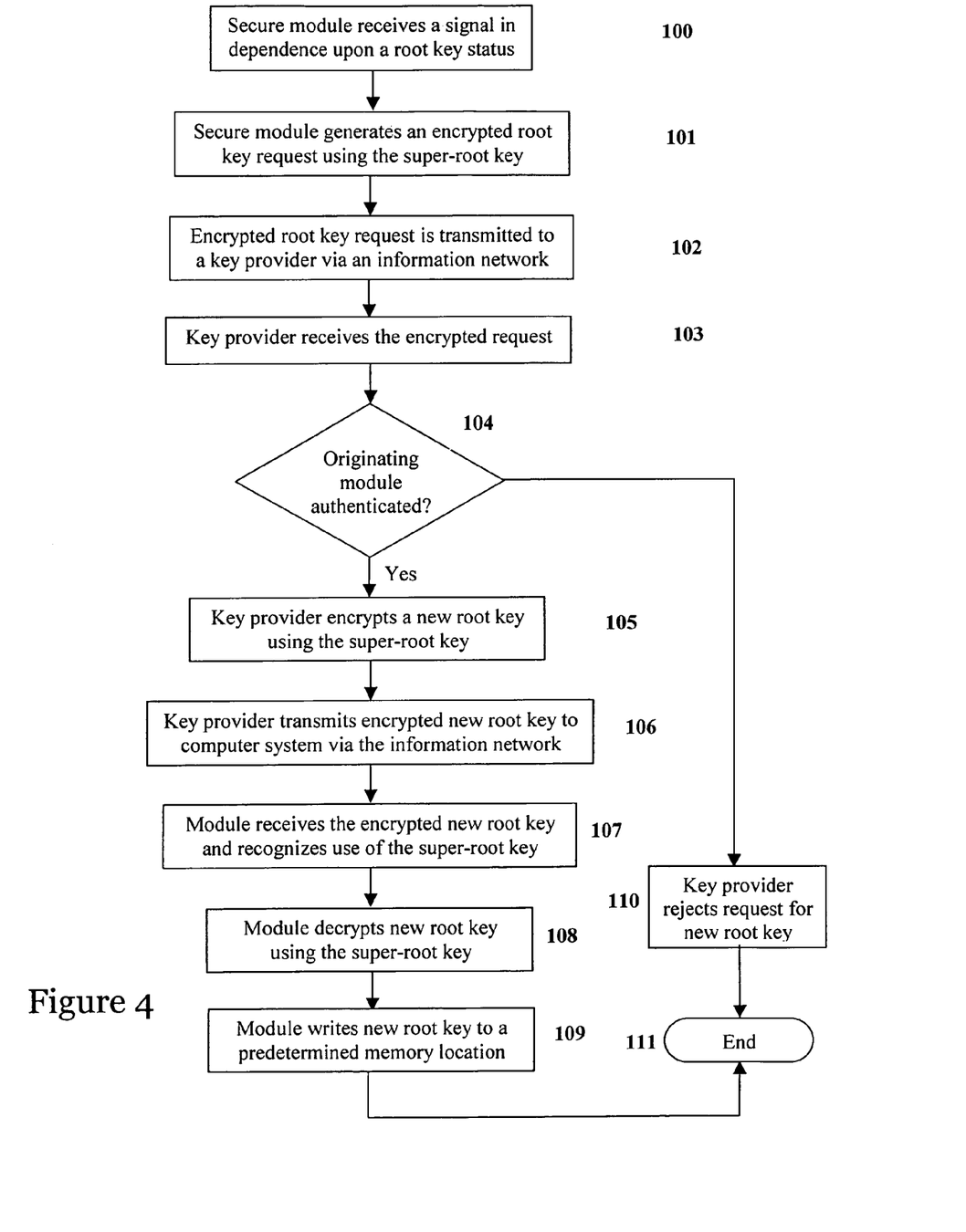
FIG. 4 shows a simplified flow diagram of a method for providing a private root key via an information network that is other than secure using the system of FIG. 2.

Referring now to FIG. 4, shown is a simplified flow diagram of a method for providing a private root key via an information network that is other than secure using system 20 of FIG. 2. Module 10 receives a signal to generate a root key request at step 100 in dependence upon a current root key status. For example, the signal is sent to module 10 when the root key is compromised or after a predetermined root key usage limit is achieved. The module 10 generates a root key request and encrypts said root key request at step 101 using the super-root key that is stored within the memory circuit of module 10. Computer system 1 transmits at step 102 the encrypted root key request to network server 5 via the information network 6 that is other than secure. At step 103 the encrypted key request is received at network server 5. The key provider authenticates the originating module 10 at decision step 104, for example the key provider decrypts the encrypted key request using the super-root key. If the originating module is authenticated then the key-providing unit 21 of server 5 encrypts at step 105 a new root key using the super-root key. The encrypted new root key is transmitted via the information network 6 to computer system 1 at step 106. Upon receipt at computer system 1, the encrypted new key is provided to module 10 and is recognized at step 107 as a new root key by the use of the super-root key for encryption. At step 108 the module 10 decrypts the new root key using the super-root key stored within a memory circuit thereof and writes the new root key to a predetermined memory location at step 109. For example, the root key is written to an area of the memory circuit of module 10, such that access to the root key from outside of the module is prevented and FIPS-140 compliance is maintained. Optionally, the root key is provided outside of the module to one of a second secure module and an external processor, such as for example processor 8. The method of FIG. 4 is terminated at step 111.

Of course, if the originating module 10 is other than authenticated by the key provider at decision step 104, then the key provider rejects the request for a new root key and the method of FIG. 4 is terminated at step 111.

The method of FIG. 4 is also used with the auditable system 30 that was described with reference to FIG. 3. In system 30 the key-providing unit 21 is replaced with a secure module 22 that is similar to the one that is installed in computer system 1. Of course, all operations are performed in code internal to the modules 10 and 22 such that external access to the super-root key is avoided during root key exchange. Also, for meeting the FIPS standards, the root key, once decoded, is stored within the module and is unavailable to the host processor. Thus, the root key is not compromisable by dishonest employees or hackers. Advantageously the internal code for exchanging the root keys is independently auditable to provide further assurance that a root key transfer occurs in a secure fashion.

The present invention enables a key provider to establish a secure communication path for providing root keys to a computer system. It is an advantage of the present invention that access to the super-root key is avoided at all time, such that the user of the computer system is able to request a new root key at any time. In the event that every encryption key and every root key of a computer system is compromised during a same overlapping period of time, the user is able to obtain a complete set of replacement keys without requiring a visit from the key provider. First the super-root key is used to replace the compromised root keys, and secondly the replacement root keys are used to replace the compromised encryption keys. Advantageously, the computer system resumes normal operation after incurring only minimal down-time losses. Further advantageously, when key replacement after key compromise is implemented automatically by code internal to a secure cryptographic module, then the amount of confidential data that is vulnerable to compromise is minimized.

In accordance with an alternative embodiment, two super root keys are provided within each module wherein one of the super-root keys is for replacing the other super-root key thereby providing a system to allow replacement of all symmetric super-root keys in all modules upon any indication of key compromise or at intervals when desired.

Figure 5:
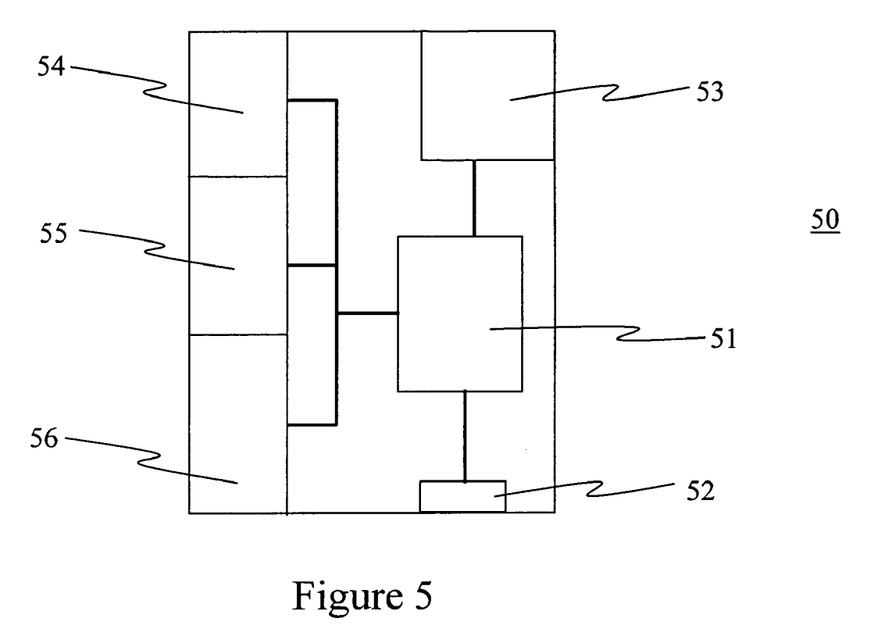
FIG. 5 shows a schematic block diagram of a secure module for use in a system for transferring a secure electronic key between a key provider system and a customer computer system via an information network that is other than secure.

Referring now to FIG. 5, a schematic block diagram of a secure module for use in a system for transferring a secure electronic key between a key provider system and a customer computer system via an information network that is other than secure is shown generally at 50. The secure module 50 includes: an encryption processor 51; an input port 52 for receiving encrypted electronic data from outside the module 50 and for providing the encrypted electronic data to the encryption processor 51; a read-only memory (ROM) circuit 54 in operative communication with the encryption processor 51 for storing permanently a super-root key provided with the module; and, a memory storage area 53 having program code stored therein and executable on the encryption processor 51. Module 50 also includes a memory circuit 55 for storing decrypted root keys that are transferred from the key provider system to the customer and a memory circuit 56 for storing decrypted encryption keys that are obtained from at least one of the key provider system and a second other key provider system. Memory circuits 55 and 56 are optionally one of an electrically erasable programmable read only memory (EEPROM) circuit, and a random access memory (RAM) circuit.

In use, module 50 is in electrical communication with the customer computer system 1 of FIG. 1 via input port 52 for receiving at least an encrypted root key, the encrypted root key being provided by the key provider system via the information network that is other than secure. The program code stored within the memory storage area 53 is for, upon receipt of the encrypted root key, decrypting the encrypted root key using the super-root key stored in memory circuit 51 and for storing the decrypted root key within the memory circuit 55. Advantageously, the super-root key stored within the ROM circuit 54 is other than accessible by any code other than the program code and is other than modifiable thereby. Further advantageously, the root key and encryption key are stored within separate memory circuits 55 and 56, the contents of which memory circuits are modifiable at any time that replacement electronic keys are provided to the computer system 1. Optionally, the separate memory circuits 55 and 56 are replaced with a single EEPROM or RAM memory circuit having a plurality of memory storage locations for storing electronic keys.

Figure 6:
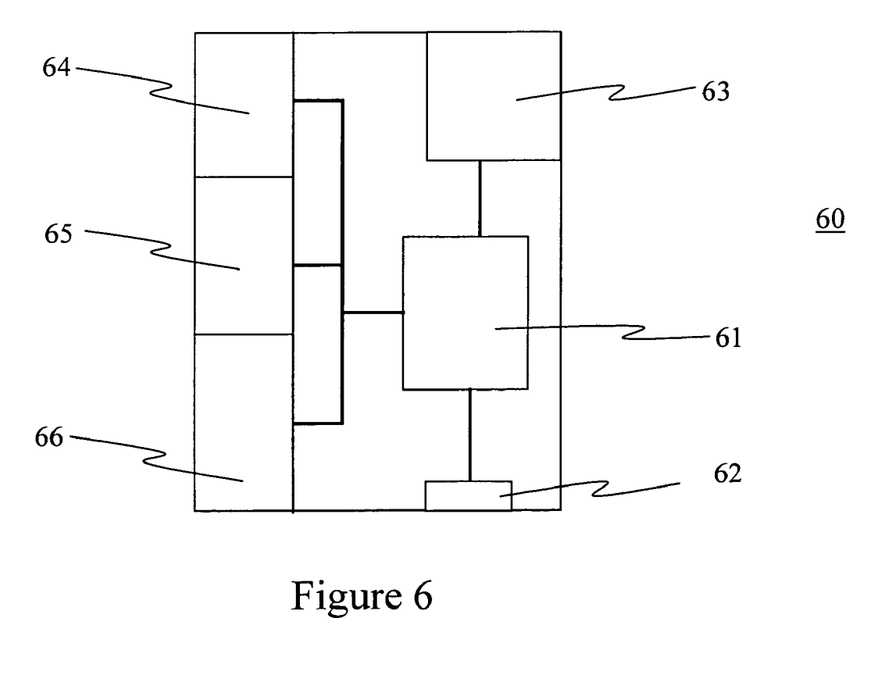
FIG. 6 shows a schematic block diagram of another secure module for use in a system for transferring a secure electronic key between a key provider system and a customer computer system via an information network that is other than secure.

Referring now to FIG. 6, a schematic block diagram of a secure module for use in a system for transferring a secure electronic key between a key provider system and a second other system via an information network that is other than secure is shown generally at 60. The secure module 60 includes: an encryption processor 61; an input port 62 for receiving encrypted electronic data from outside the module 60 and for providing the encrypted electronic data to the encryption processor 61; a memory circuit 64 in operative communication with the encryption processor 61 for storing a first super-root key within a first memory location thereof and for storing a second other super-root key within a second other memory location thereof, the first and second super-root keys provided with the module; and, a memory storage area 63 having program code stored therein and executable on the encryption processor. Memory circuit 64 is optionally one of an electrically erasable programmable read only memory (EEPROM) circuit, and a random access memory (RAM) circuit. Module 60 also includes a memory circuit 65 for storing decrypted root keys that are transferred from the key provider system to the customer and a memory circuit 66 for storing decrypted encryption keys that are obtained from at least one of the key provider system and a second other key provider system. Memory circuits 65 and 66 are also optionally one of an electrically erasable programmable read only memory (EEPROM) circuit, and a random access memory (RAM) circuit.

In use, module 60 is in electrical communication with the customer computer system 1 of FIG. 1 via input port 62 for receiving at least one of an encrypted root key and an encrypted super-root key, the at least one of the encrypted root key and the encrypted super-root key being provided by the key provider system via the information network that is other than secure. The program code stored within the memory storage area 63 is for, upon receipt of the encrypted root key, decrypting the encrypted root key using one of the first and second super-root keys stored in memory circuit 61 and for storing the decrypted root key within the memory circuit 65. Additionally, the program code stored within the memory storage area 63 is for, upon receipt of an encrypted super-root key from the key provider system, decrypting the encrypted super-root key using one of the first and second super-root keys stored in memory circuit 61 and for storing the decrypted super-root key within a memory location of memory circuit 65 corresponding approximately to the memory location of the other one of the first and second super-root keys. Advantageously, module 60 provides a system for the secure transfer of super-root keys via an information network that is other than secure. Optionally, the separate memory circuits 64, 65 and 66 are replaced with a single EEPROM or RAM memory circuit having a plurality of memory storage locations for storing electronic keys.

Numerous other embodiments may be envisaged without departing from the spirit or scope of the invention.

What is claimed is:

1. A method for transferring a first super-root key between a key provider system and a second other system via an information network comprising the steps of:
    a) encrypting the first super root key using a second super-root key of the key provider system;
    b) providing within the second other system a first secure module having third and fourth super-root keys within a memory circuit thereof, the third and fourth super-root keys accessible only by program code being executed on a processor internal to the first secure module for decrypting encrypted root keys and encrypted super-root keys and for storing the decrypted keys within a memory circuit of the first secure module, and wherein the third and fourth super-root keys are other than accessible outside of the module, and wherein the third and fourth super-root keys are private keys;
    b1) automatically generating by the first secure module a super-root key request in dependence on a super-root key status;
    c) transferring the encrypted first super-root key from the key provider system to the second other system via the information network in response to the super-root key request;
    d) providing the encrypted fourth super-root key to the processor internal to the first secure module of the second other system; and,
    e) executing program code on the processor internal to the first secure module to decrypt the encrypted first super-root key using the third super-root key stored within the memory circuit of the first secure module and to store the decrypted first super-root key internally within a secure key memory location of the first secure module.

2. A method for transferring a first super-root key between a key provider system and a second other system via an information network according to claim 1 further comprising the steps of:
    f) executing program code on the processor internal to the first secure module to store the decrypted first super-root key within the memory circuit of the first secure module at a location corresponding approximately to the location where the fourth super-root key was stored.

3. The method according to claim 2 wherein one of the third and fourth super-root keys are only replaceable through use of the other of the third and fourth super-root keys.

4. The method according to claim 2 wherein the step of storing the decrypted first super-root key comprises the steps of:
    i1) erasing the fourth super-root key from a first storage area of the memory circuit; and,
    i2) storing the decrypted first super-root key within approximately the same first storage area of the same memory circuit.

5. The method of claim 1 wherein the first, third, and fourth super-root keys are only for decrypting at least one of encrypted private root keys and encrypted private super-root keys generated by the key provider system.

6. A secure module for use in a system for transferring a secure super-root key between a key provider system and a second other system via an information network that is other than secure, the secure module in operative communication with the second other system, the secure module including:
    an encryption processor;
    an input port for receiving encrypted electronic data from outside the module and for providing the encrypted electronic data to the encryption processor;
    a memory circuit in operative communication with the encryption processor for storing a first super-root key within a first memory location thereof and for storing a second super-root key within a second other memory location thereof,
    memory storage having program code stored therein and executable on the encryption processor for, upon receipt of an encrypted third super-root key, decrypting the encrypted third super-root key using one of the first and second super-root keys and for storing the decrypted third super-root key at a memory location corresponding to the other one of the first and second super-root keys, the first, second, and third super-root keys when stored in the memory circuit being accessible only by the program code and being modifiable only by the program code for all modifications excluding erasure, wherein the first, second, and third super-root keys are private keys; and a super-root key request generator for generating a super-root key request in dependence on a super-root key status.

7. The secure module according to claim 6 wherein the code executable on the encryption processor accesses the super-root keys stored in the memory circuit only in response to a request from a corresponding secure module.

8. The secure module according to claim 7 wherein the code executable on the encryption processor is for performing encryption functions the results of which are inaccessible outside of the module.

9. The secure module according to claim 8 wherein the memory circuit for storing the super-root keys is a non-volatile reprogrammable memory circuit.

10. The secure module according to claim 8 wherein the memory circuit for storing the super-root keys is one of an electrically erasable programmable read-only memory (EEPROM) circuit and a random access memory (RAM) circuit having an on-board power supply in the form of a battery.

11. The secure module according to claim 10 wherein the module is FPS140 compliant.

12. The secure module according to claim 11 wherein the module includes a tamper detection circuit for erasing every cryptographic key stored within the memory circuit in dependence upon a detected attempt to access the electronic contents of the module in an unauthorized fashion.

* * * * *